United States Patent [19]

Johnson

[11] Patent Number: 4,704,470

[45] Date of Patent: Nov. 3, 1987

[54] POLYMERIZABLE ANTIOXIDANTS FROM ISOCYANATOALKYL ESTERS OF UNSATURATED CARBOXYLIC ACIDS

[75] Inventor: Mark R. Johnson, Breckenridge, Mich.

[73] Assignee: The Dow Chemical Company, Midland, Mich.

[21] Appl. No.: 608,631

[22] Filed: May 9, 1984

Related U.S. Application Data

[63] Continuation of Ser. No. 298,688, Sep. 2, 1981.

[51] Int. Cl.[4] .................. C07C 125/04; C07C 125/06
[52] U.S. Cl. .................................... 560/137; 260/404; 260/404.5; 260/399; 560/222; 558/153; 558/240; 525/384; 525/386
[58] Field of Search ................. 525/384, 386; 560/24, 560/115, 157, 137, 222; 558/153, 240; 260/404, 404.5, 399

[56] References Cited

U.S. PATENT DOCUMENTS

| | | | |
|---|---|---|---|
| 3,477,991 | 11/1969 | Patton et al. | 260/47 |
| 3,627,831 | 12/1971 | Huber-Enden et al. | 260/562 |
| 3,658,769 | 4/1972 | Kline | 260/78 |
| 3,849,373 | 11/1974 | Siegle et al. | 260/47 |
| 4,078,015 | 3/1978 | Leitheiser et al. | 560/24 |
| 4,155,955 | 5/1979 | Parks et al. | 260/879 |
| 4,250,322 | 2/1981 | Efimov et al. | 560/115 |
| 4,287,323 | 9/1981 | Tefertiller et al. | 560/157 |
| 4,340,497 | 7/1982 | Knopf | 560/24 |

OTHER PUBLICATIONS

Encyclopedia of Polymer Science & Technology, John Wiley & Sons, vol. 2, N.Y., N.Y., 1965, pp. 171–173, 175–177, 184–187.

Kline et al., "Preparation & Activity of Polymerizable Antioxidants for Emulsion Rubbers", *Rubber Chemistry & Technology*, 46, 95–105, (1973).

Scott, Gerald, "Rubber-Bound Antioxidants", *Plastics & Rubber Processing*, Jun. 1977, pp. 41–48.

Meyer et al., "Emulsion Rubbers Copolymerized with Monomeric Antioxidants", *Rubber Chemistry & Technology*, 46, 106–114, (1973).

Primary Examiner—John C. Bleutge
Assistant Examiner—Robert E. L. Sellers, II

[57] ABSTRACT

An addition polymerizable antioxidant is prepared by reacting an isocyanatoalkyl ester of an addition polymerizable carboxylic acid (2-isocyanatoethyl methacrylate) with an antioxidant functionality bearing an active hydrogen moiety which is reactive with the isocyanate.

6 Claims, No Drawings

POLYMERIZABLE ANTIOXIDANTS FROM ISOCYANATOALKYL ESTERS OF UNSATURATED CARBOXYLIC ACIDS

This Application is a continuation of copending U.S. patent application Ser. No. 298,688, filed Sep. 02, 1981 now abandoned.)

BACKGROUND OF THE INVENTION

This invention relates to antioxidants which are addition polymerizable.

The demands made on polymeric materials in industrial, commercial and consumer fields are continuously increasing. To improve polymers, the use of antioxidants has been extremely important. Antioxidant formulations currently in use have been developed on an essentially empirical basis by using a limited number of selection procedures. Traditional selection tests, such as the oxygen-absorption test or the oxygen-bomb or air-oven tests may be adequate predictors of antioxidant performance in nondiscriminating applications, but they are quite inadequate under the aggressive conditions often experienced by polymers in modern environments. The ability of an antioxidant to protect polymers under the high-temperature conditions, for instance, of an automobile engine, particularly in contact with fuels or lubricating oils, depends not only on its intrinsic activity, which is adequately reflected by its performance in an oxygen-absorption or oxygen-bomb test, but on its ability to remain in the polymer under these conditions. A similar analysis applies to polymers which are subjected to repeated cleansing operations such as detergent washing or solvent dry cleaning, particularly when they are in the form of articles with a high surface area to volume ratio such as fibers or films.

Three main factors affect antioxidant performance. The first is the intrinsic activity of the antioxidant functional group. This may be evaluated by the induction period of 1-dodecene in a closed system where there is no possibility of loss by volatilization. The second factor is the compatibility or solubility of the antioxidant in the polymer. This second factor is important in situations which are not totally obvious. For instance, a system employing a mixture of two or more polymers may initially have an antioxidant dispersed throughout the system. Upon aging, however, the antioxidant may migrate from one polymer phase to one or more of the other polymer phases, leaving part of the system unprotected. The third factor, discussed above, which is dominant in an open system, is the leaching, or volatility of the antioxidant.

A number of approaches have been tried to solve the problem of the volatilization of antioxidants in polymeric materials. One such approach has been to chemically combine the antioxidant with the polymeric material sought to be protected. Within this approach, several researchers have synthesized antioxidants which have an addition polymerizable double bond. These attempts, however, have not been wholly satisfactory. The polymerizable antioxidants disclosed in the literature are generally expensive to manufacture in that they require synthesis routes which are energy intensive and time consuming. In addition, the products produced by these methods are often inadequate in their ability to function as an antioxidant. Further, the synthesis routes described in the literature generally produce large amounts of impurities, which interfere with the antioxidant properties or other aspects of the polymer system in which they are employed.

Accordingly, it would be desirable to have a polymerizable antioxidant which has a high antioxidant activity, is energy efficient to manufacture, may be quickly and easily manufactured and is relatively free of harmful impurities.

SUMMARY OF THE INVENTION

In one aspect, the invention is a polymerizable antioxidant comprising a compound of the formula:

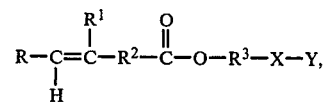

in which R is H or an organic group, $R^1$ is H or $CH_3$, $R^2$ is not present or is a $C_1$–$C_{20}$ organic group, R, $R^1$ and $R^2$ all such that the C=C double bond is polymerizable, $R^3$ is a $C_1$–$C_{12}$ organic group, X is a urethane-type linkage and Y is an antioxidant functionality.

In another aspect, the invention is a method of making such an antioxidant. In yet another aspect, the invention is a polymer having such an antioxidant incorporated therein.

Surprisingly, the antioxidants of the invention have high antioxidant activity, are energy efficient to manufacture, may be quickly and easily manufactured, and are relatively free of impurities.

DETAILED DESCRIPTION OF THE INVENTION

The polymerizable antioxidants of the present invention may be generally described as esters of ethylenically unsaturated carboxylic acids, the alcohol residues of which contain a urethane-type linkage proximal to the acyl group of the ester and an antioxidant functionality distal to the acyl group. These esters may be the esters of any addition polymerizable carboxylic acid. While typically not prepared directly from carboxylic acids, these esters correspond to esters of, for instance, acrylic acid, methacrylic acid, and cis- and trans-2-butenoic acid. While not preferred, addition polymerizable dicarboxylic acids such as, cis- and trans-2-butendioic acids (maleic and fumaric acids) may be used.

The polymerizable antioxidants of the present invention may also be described by the formula:

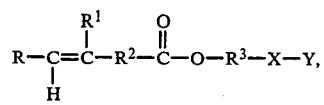

in which R is H or an organic group, $R^1$ is H or $CH_3$, $R^2$ is not present or is a $C_1$–$C_{20}$ organic group, R, $R^1$ and $R^2$ all such that the C=C double bond is polymerizable, $R^3$ is a $C_1$–$C_{12}$ organic group, X is a urethane-like linkage and Y is an antioxidant functionality. In preferred embodiments, R is H, $R^2$ is not present and $R^3$ is a $C_1$–$C_5$ organic chain.

In the practice of the instant invention, the preferred method for making the polymerizable antioxidants involves the reaction of an isocyanatoalkyl ester of an ethylenically unsaturated carboxylic acid with an antioxidant functionality having an active hydrogen moiety.

Preferred isocyanatoalkyl esters include 2-isocyanatoethyl acrylate and 2-isocyanatoethyl methacrylate (IEM).

The antioxidant functionality of the instant invention may be any antioxidant functionality which is not excessively reactive with isocyanate moieties under the conditions employed for preparation of the polymerizable antioxidant. That is to say, one cannot use an antioxidant wherein the antioxidant moiety will be rendered substantially inactive by reaction with the isocyanate. Suitable types of antioxidant functionalities include amines, phenols, phosphites, thioesters (sulfides) and metal salts of thio acids.

Common amines include ketone-amine condensation products, diaryldiamines, diarylamines and ketone-diaryl amine condensation products. Most conventional blended amine antioxidants are discoloring and staining, and are used in applications where this property can be tolerated.

Phenolic antioxidants are generally less discoloring than the amines. They are used in applications where these properties are necessary, and are of increasing commercial importance. Most of the newer commercial antioxidants are of this type, such as alkylated hydroquinones and the phenols. Hindered phenols and ortho hydroquinones have particular utility in the invention. Hindered phenols are generally unreactive with isocyanates. Ortho hydroquinones will generally react only once with an isocyanate. This reaction renders the remaining —OH group more hindered and less reactive.

Certain phosphites are used to protect rubber during manufacture and in storage. For plastics, they are generally used in combination with other antioxidants, particularly phenols.

Thioesters (sulfides) are generally used with phenols in plastics to give synergistic combinations.

The metal salts of dithioacids act as hydroperoxide decomposers and propagation inhibitors. They are generally used in conjunction with other antioxidants, particularly phenols, for rubber, petroleum products and plastics.

Of the above classes of antioxidants, phenols, amines and thioesters are most preferred for use in the instant invention.

Although the antioxidant functionalities useful in the invention are commercially available, they often do not have other functionalities which are suitable for reaction with the isocyanatoalkyl ester, and must be suitably modified. The antioxidant must be modified such that it bears a pendant group which will react with an isocyanate moiety to produce a "urethane-type" linkage. By the term "urethane-type" linkage is meant to include not only a true urethane linkage

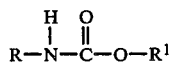

wherein an isocyanate is reacted with an organic hydroxyl group, but also to include the reaction of an isocyanate with any active hydrogen moiety. An active hydrogen moiety is generally any moiety which will react with an isocyanate group. One means of predicting this tendency is the Zerewitnoff test described by Woller in *Journal of the American Chemical Society*, Vol. 49, page 3181 (1927). Specific examples of suitable active hydrogen compounds include amines, alcohols, thiols, carboxylic acids and carboxamides. Amines and alcohols are the preferred, with alcohols being most preferred.

The reactions necessary to provide the antioxidant functionality with a suitable active hydrogen moiety are varied, depending upon the specific type of antioxidant functionality, and the other moieties available for reaction. While these steps are not shown in the literature as a group, the individual reactions between the active portions of the molecules are well-known and may be carried out in the manner shown in the examples.

The antioxidant functionality which has an active hydrogen moiety or which has been provided with an active hydrogen moiety may be reacted with the isocyanate moiety of the isocyanatoalkyl ester under conditions conventional for urethane formation reactions. Preferably, the reaction takes place at room temperature with a small amount of a conventional urethane catalyst. The reaction takes place in a relatively short time, yielding a pure product at near 100 percent conversion.

The polymerizable antioxidants may be used as other antioxidants by simply blending the antioxidant with the material it protects. However, a particular advantage of these antioxidants is their ability to become bound to the polymer in which they are used, either by being copolymerized with the monomers of the polymer, or by being grafted onto the polymer after the polymer has been prepared. The latter approach is often preferred in that it allows the polymer to be premanufactured and provided with antioxidants only when the need arises.

When the antioxidant is copolymerized, it is added like any other monomer, and becomes part of the polymer. When it is grafted onto the polymer, it is added to the polymer with a sufficient amount of an initiator so that grafting occurs. In grafting, it is possible to add a small amount of another addition polymerizable monomer when the antioxidant is added.

Further details of the invention will be apparent from the following examples which are provided to illustrate the invention and are not intended to limit the scope of the invention. In the examples, all parts and percentages are by weight, unless otherwise specified.

EXAMPLE 1

A solution of 0.58 g. of t-butylcatechol (3.49 millimoles) in 1 ml. of methylene chloride is treated with the 0.54 g. (3.48 millimole) of IEM and 5 μl. of triethylamine. After standing overnight at room temperature, the solvent is removed to yield a mixture of the two isomeric mono-acylated products as a glass.

EXAMPLE 2

A solution of 0.58 g. (3.49 millimoles) of t-butylhydroquinone in 1 ml. each of methylene chloride and ethyl acetate is treated with 0.53 g. (3.48 millimoles) of IEM and 5 μl. triethylamine. After stand overnight at room temperature, the solvent is removed to yield a glassy solid consisting mainly of the mono-acylated product with small amounts of the diacylated product and the starting hydroquinone.

EXAMPLE 3

A solution of 0.5 g. (2.25 millimoles) of 2,6-di-t-butylhydroquinone in 5 ml. of methylene chloride is treated with 0.34 g. (2.19 millimoles) of IEM and 2 drops of triethylamine. After standing for two days at 4° C., the solvent is removed to give the mono-acylated product as a brown oil.

EXAMPLE 4

A solution of 10 g. of 2,6-di-t-butyl-4(3-hydroxypropyl) phenol (37.9 millimoles) in 100 ml. methylene chloride is treated with 5.87 g. (37.9 millimoles) of IEM and 100 μl. triethylamine. After standing overnight at room temperature, the solvent is removed to yield the expected urethane as a thick oil.

EXAMPLE 5

A sample of 100.3 g. of 2-mercaptoethanol is treated with 1 ml. of triethylamine and is chilled in an ice bath. To this solution, 131 g. of butyl acrylate are added dropwise over about 1.5 hours. The solution is warmed to room temperature and additional butyl acrylate is added in small aliquots until liquid chromatographic analysis indicates complete conversion of the starting thiol. The total butyl acrylate is 161 g., 98 percent of theoretical. The product obtained by this procedure is a water-white liquid with purity exceeding 98 percent.

A solution of 5.0 g. (24.3 millimoles) of this product (butyl-3-(2-hydroxyethylthio)propionate) in 50 ml. of methylene chloride is treated with 3.76 g. (24.3 millimoles) of IEM and is allowed to stand at room temperature overnight. Considerable starting material remains and 2 drops of dibutyltin diacetate are added. After several hours the reaction is complete and solvent is removed under vaccuum to yield the urethane as a water-white and odorless liquid.

EXAMPLE 6

A solution of 20 g. (108.7 millimoles) of p-aminodiphenylamine in 150 ml. of methylene chloride is chilled in an ice bath and then treated with 16.95 g. (108.7 millimoles) of IEM. The mixture is stirred for 16 hours while the ice bath melts, at which time considerable precipitate has formed. The mixture is poured into another 100 ml. of methylene chloride, and the product collected by filtration to give 32.0 g. of product with a melting point of 126°–129° C.

EXAMPLE 7

A solution of 100 g. (0.342 mole) of methyl-3-(3,5-di-t-butyl-4-hydroxyphenyl)propionate in 500 ml. of toluene is treated with 21.4 g. (0.350 mole) of monoethanolamine and heated to 100° C. At this temperature, 1 g. (0.018 mole) of sodium methoxide is added and the solution refluxed for 3 hours. The mixture is allowed to cool, and after stirring overnight, the precipitate collected by filtration and dried under vacuum to yield 107.6 g. of product having a melting point of 128°–129° C. and a yield of 98 percent.

A mixture of 8 g. (24.92 millimoles) of this product (N-(2-hydroxyethyl)-3-(3,5-di-t-butyl-4-hydroxyphenyl)propionamide) and 100 ml. toluene is heated to reflux to remove residual moisture by azeotropic distillation. It is then cooled to 75° C. and treated with 2 drops dibutyltin diacetate and 3.78 g. (24.4 millimoles) of IEM. The solution is allowed to cool to room temperature and seeded with a small amount of the urethane which induces crystallization. The product is collected by filtration to give 11.05 g. (94 percent yield) of urethane product with a melting point of 103°–104° C.

EXAMPLE 8

A sample of 103.5 g. of a 40 percent solids styrene/butadiene/itaconic acid (58/40/2) latex containing no antioxidant has an antioxidant grafted to it by treatment with a solution of 0.4 g. of the antioxidant of Example 7 in 1 ml. of a 50/50 mixture of styrene and methanol and a solution of 30 mg. of sodium per sulfate in 1 ml. of water. The latex is stirred under nitrogen for 30 minutes at room temperature, and then for 6 hours at 80° C. The latex is allowed to cool and is then evaluated. The antioxidant level is calculated at 1 percent, based on latex solids.

For comparison, additional samples of the same latex are blended (not grafted) with other antioxidants. The antioxidants are blended by dissolving them in a small amount of styrene, adding them to the latex and shaking them for several hours. The levels of the blended antioxidants were selected to give the same concentration of hindered phenol groups in each sample as in the grafted antioxidant sample. Duplicate films were prepared from each of the latexes, and one of the films is extracted with hexane for 7 hours. All films were aged at 145° C. in air, and the amount of yellowing was observed. Data recorded after 24 hours is reported in Table I. Only the film with the grafted antioxidant (from Example 7) was unaffected by the hexane.

TABLE I

| Rank of Yellowing | | No Hexane Exposure | 7 Hour Hexane Exposure | |
|---|---|---|---|---|
| least ↑ ↑ ↑ ↓ most | same | { 1% Example 7<br>1.3% Irganox ® 1076[1]<br>0.7% Irganox ® 1010[1]<br><br>0.5% Wingstay ® L[2]<br>0.75% Ionol ®[3] | 1% Example 7<br><br>1.3% Irganox ® 1076[1]<br>0.7% Irganox ® 1010[1]<br>0.5% Wingstay ® L[2]<br>0.75% Ionol ®[3] | same |

[1]Available from Ciba-Geigy Corp., Greensboro, NC, U.S.A.
[2]Available from Goodyear Tire and Rubber Co., Akron, OH, U.S.A.
[3]Available from Shell Chemical Co., Houston, TX, U.S.A.

EXAMPLE 9

A latex is prepared by copolymerizing 32 parts styrene, 65 parts butadiene and 3 parts acrylic acid by standard emulsion polymerization methods and is labeled Latex I. The recipe is repeated, except that 0.4 part of the antioxidant of Example 7 is included with the monomer mixture. This latex is designated Latex II. Latex I is blended with 2.5 parts of a thioester-hindered phenol antioxidant system which does not have an addition polymerizable double bond. The latex samples are cast as 0.005 inch (0 127 mm.) films on glass microscope slides. These samples are evaluated for antioxidant performance by chemiluminescence. These results are reported in Table II.

TABLE II

| Temp. | Luminescence[1] | | |
|---|---|---|---|
| | Latex I | Latex I and Blended AO | Latex II |
| 100° C. | 260 | 30 | 40 |
| 120° C. | 3840 | 140 | 170 |

[1]Photon counts/sec. at 30 minutes

What is claimed is:

1. A polymerizable antioxidant comprising a compound of the formula:

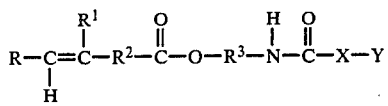

in which R is H or an organic group; $R^1$ is H or $CH_3$; $R^2$ is not present or is a $C_1$–$C_{20}$ organic group; wherein R, $R^1$ and $R^2$ are such that the C=C double bond is addition polymerizable; $R^3$ is a $C_1$–$C_{12}$ organic group, X is a linkage derived from the active isocyanate group reacted with an organic hydroxyl group or other active hydrogen moiety pendent from an antioxidant; and Y is an active antioxidant functionality selected from the group consisting of amines, phenols, phosphites, thioesters and metal salts of thio acids.

2. The antioxidant of claim 1 wherein R is H.

3. The antioxidant of claim 1 wherein $R^2$ is not present.

4. The antioxidant of claim 1 wherein R is H, $R^2$ is not present and $R^3$ is a $C_1$–$C_5$ organic chain.

5. The antioxidant of claim 1 wherein R is H, $R^1$ is $CH_3$, $R^2$ is not present and $R^3$ is a $C_2$ alkyl chain.

6. The antioxidant of claim 1 wherein X is the reaction product of an isocyanate and a hydroxyl group.

* * * * *

UNITED STATES PATENT AND TRADEMARK OFFICE
CERTIFICATE OF CORRECTION

PATENT NO. : 4,704,470

DATED : November 3, 1987

INVENTOR(S) : Mark R. Johnson

It is certified that error appears in the above-identified patent and that said Letters Patent is hereby corrected as shown below:

Column 4, line 47, "millimole" should be --millimoles--.

Column 4, line 56, "stand" should be --standing--.

Column 6, line 65, "(0 127 mm)" should be --(0.127 mm.)

Signed and Sealed this

Seventeenth Day of May, 1988

Attest:

DONALD J. QUIGG

*Attesting Officer*     *Commissioner of Patents and Trademarks*